United States Patent [19]

Murayama et al.

[11] Patent Number: 4,942,190

[45] Date of Patent: Jul. 17, 1990

[54] THERMOSETTING INSULATING RESIN PASTE

[75] Inventors: Masakazu Murayama; Ken Kimura; Hiroyuki Nakajima; Yasuko Ohno; Eiki Zidai, all of Amagasaki, Japan

[73] Assignee: Mitsubishi Denki Kabushiki Kaisha, Japan

[21] Appl. No.: 262,937

[22] Filed: Oct. 21, 1988

[30] Foreign Application Priority Data

Oct. 27, 1987 [JP] Japan ................................ 62-272670

[51] Int. Cl.$^5$ .................. C08L 63/02; C08K 3/34; C08K 3/22; C08K 3/08
[52] U.S. Cl. ............................ 523/400; 523/457; 523/458; 523/466; 523/442
[58] Field of Search ............ 523/466, 457, 458, 400, 523/442

[56] References Cited

U.S. PATENT DOCUMENTS

| | | | |
|---|---|---|---|
| 3,904,813 | 9/1975 | Groff | 525/930 |
| 4,593,069 | 6/1986 | Kamagata et al. | 525/504 |
| 4,663,190 | 5/1987 | Fujita et al. | 528/111 |

FOREIGN PATENT DOCUMENTS

| | | | |
|---|---|---|---|
| 3340788 | 5/1985 | Fed. Rep. of Germany | 523/466 |
| 55-165916 | 12/1980 | Japan | 523/466 |
| 60-4521 | 1/1985 | Japan . | |
| 60-004523 | 1/1985 | Japan | 523/466 |
| 60-069174 | 4/1985 | Japan | 523/457 |
| 62-195016 | 8/1987 | Japan | 523/466 |

OTHER PUBLICATIONS

Sano, H., "Feature of Die Bonding Epoxy and Die Bonding Techniques", Aug. 7, 1985.

*Primary Examiner*—Lewis T. Jacobs
*Attorney, Agent, or Firm*—Leydig, Voit & Mayer

[57] ABSTRACT

A thermosetting insulating resin paste including 100 parts by weight of an epoxy resin containing a diglycidyl type liquid epoxy resin as a main component and based on the parts by weight of the epoxy resin, 0.5 to 10 parts by weight of dicyandiamide as a setting agent. It further contains 1 to 15 parts by weight of a phenoxy resin, 0.1 to 8 parts by weight of 2-phenyl-4-methyl-5-hydroxymethylimidazole and/or 2-phenyl-4,5-dihydroxymethylimidazole as a setting accelerator as well as 50 to 200 parts by weight of a thermally conductive filler. This insulating resin paste exhibits a long pot life and can be set in a short time at a low temperature without generating any voids during the setting, so that it enables the die bonding process in the production of semiconductor devices to be performed as part of the production line. It also allows a smaller device to be used in this process.

20 Claims, No Drawings

THERMOSETTING INSULATING RESIN PASTE

BACKGROUND OF THE INVENTION

1. Field of the Invention

This invention relates to a low temperature quick-setting type thermosetting insulating resin paste which is composed of a liquid epoxy resin, a setting agent, a setting accelerator and a filler, and which exhibits a very long pot life. More specifically, this invention relates to a non-solvent one-liquid type, resin paste for die bonding.

2. Description of the Prior Art

The remarkable present-day developments of the electronics industry has led to a rapidly increasing degree of circuit integration in semiconductor devices such as ICs and LSIs. At the same time, it has become possible to produce such semiconductor devices in large quantities. In view of the reduction in the prices of products utilizing such semiconductor devices, there is an urgent demand for increased efficiency and reduced cost in the mass-production of such products.

Conventionally, semiconductor parts are produced by die bonding semiconductor devices on lead frames and then sealing them with a hermetic seal. Since the original development of the method of sealing semiconductor devices with a thermosetting resin, it has become the practice to use a method of die bonding them with a conductive resin containing silver powder. This has contributed much to the enhancement of production efficiency and cost reduction.

At present, the die bonding process is generally performed using a conductive resin paste. However, in some types of chips including most MOS.ICs, metallization of the chip back surface can be dispensed with by drawing the sub-electrode out of the bonding pad on the chip. Accordingly, it is not necessary in such cases to employ an expensive conductive material for the die bonding resin, a relatively cheap non-conductive material being sufficient for the purpose. By using a non-conductive die bonding resin, a radical reduction in the total production cost becomes feasible.

As to the material for the lead frame, copper type materials are taking the place of the conventional 4,2-alloy because of the recent demand for further reductions in cost levels and improved thermal radiation characteristics necessitated by the increased power consumption of the chips used in many products. In this connection, a resin paste is needed which enables the bonding to be completed in a short time at a low temperature of 200 degrees C. or below, preferably 180 degrees C. or below, so that oxidation of the copper may be avoided.

However, most of the epoxy and polyimide resins conventionally used as die bonding resin pastes are generally set by heating in an oven, requiring a long setting time of ca. 30 minutes to 2 hours. Accordingly, it is impossible to conduct the process in which the resin paste is used as part of a production line. If such a resin paste were allowed to set in a short time at a high temperature (e.g. at 300 to 350 degrees C. for 20 to 30 seconds), voids might be generated due to vaporization of the paste components with relatively low boiling points such as solvents and reactive diluents. Further, decomposition of the epoxy resin might take place, resulting in the material being bonded becoming contaminated. Consequently, the idea of setting the resin paste rapidly at a higher temperature cannot be regarded as practical when one takes into consideration the above problems. It is naturally quite undesirable to set the resin paste at such a high temperature (300 to 350 degrees C.) when a copper type material is employed as the lead frame material.

Japanese Patent Laid-Open Nos. 59-149956 and 60-4521 disclose quick-setting type resin pastes aimed at having the setting process incorporated in a production line. However, most of these pastes require a setting temperature of 200 degrees C. or more. Even those which can be set at a temperature of 200 degrees C. or below, suffer changes in viscosity during use because of their short pot life, so that difficulty will be experienced when applying a given amount thereof to a lead frame.

SUMMARY OF THE INVENTION

It is accordingly an object of this invention to provide a highly efficient insulating resin paste with a long pot life which enables a die bonding process to be incorporated in a production line and which allows a smaller apparatus to be used in the process concerned. Further, this resin paste can be well applied to copper type lead frame materials and set at a low temperature in a short time, without generating voids during setting.

In accordance with this invention, there is provided a thermosetting insulating resin paste comprising:

100 parts by weight of an epoxy resin containing a diglycidyl type liquid epoxy resin as a main component;

0.5 to 10 parts by weight of dicyandiamide as a setting agent;

0.1 to 8 parts by weight of at least one of 2-phenyl-4-methyl-5hydroxymethylimidazole and 2-phenyl-4,5-dihydroxymethylimidazole as a setting accelerator; and 50 to 200 parts by weight of a thermally conductive filler.

DESCRIPTION OF THE PREFERRED EMBODIMENTS

It is desirable that the diglycidyl type liquid epoxy resin which is the main component of the epoxy resin employed in the thermosetting insulating resin paste should be one whose hydrolytic halogen atom content is 600 ppm or less, particularly 400 ppm or less, so that the reliability of the semiconductor device to be produced will not deteriorate. Two or more kinds of resins may be appropriately mixed with each other to attain this level. It is to be noted that normally used diglycidyl type liquid epoxy resins contain an excessive amount of hydrolytic halogen atoms, so that they cannot be used for this invention as they are. That is, they must be properly refined before being used. The epoxy resin used should be a liquid resin of the diglycidyl type. An epoxy resin which has more than two epoxy groups per molecule would result in an excessively viscous paste involving a low operational efficiency since such a resin is generally in a solid or semi-solid state.

In this invention, an epoxy resin containing a diglycidyl type liquid epoxy resin as the main component implies one containing 70 wt. % or more, and more preferably, 80 wt% or more, of a diglycidyl type liquid epoxy resin.

More specifically, the diglycidyl type liquid epoxy resin used in this invention may, for example, consist of one or more of the following: diglycidyl bisphenol A, diglycidyl bisphenol F, diglycidyl bisphenol S, 1,2-cyclohexane dicarboxylic acid diglycidyl ester, and polyglycol diglycidyl ether.

In this invention, the epoxy resin used may contain 20 wt. % or less of an alicyclic epoxy resin, in view of the fact that it lowers the viscosity of the epoxy resin and that it contains substantially no hydrolytic halogen atoms.

Said alicyclic epoxy resin may consist of: diesters of aliphatic dibasic acid such as adipic acid of bis (epoxy cyclohexylmethyl) and succinic acid, epoxy cyclohexylmethylepoxycyclohexane carboxylic acid ester, vinyl cyclohexene dioxide, etc.

The epoxy group of said alicyclic epoxy resin is an inner epoxy group, so that an amine type setting agent would not be very effective. As described above, however, by using it with a glycidyl type epoxy resin, a smooth setting reaction takes place in the form of copolymerization of both resins.

It is desirable that the amount of alicyclic epoxy resin contained in the epoxy resin used in this invention does not exceed 20 wt. %. This is because alicyclic resins have relatively low boiling points, so that when setting is conducted on a hot plate or similar implement of the sort generally utilized to achieve setting in a short time, the resin might instantaneously attain the setting temperature. Additionally, the setting time of the alicyclic epoxy resin is very short. As a result, voids might be generated due to vaporization of the alicyclic epoxy resin, or the copolymerization thereof with the diglycidyl type liquid epoxy resin may not take place smoothly, resulting in variations in performance.

A solid diglycidyl type epoxy resin may be added to the epoxy resin of the resin paste in accordance with this invention.

The setting agent used in this invention is dicyandiamide, a material having latency. Accordingly, it is most suited to this invention, which aims at enabling setting in a short time at a low temperature as well as offering a long pot life.

Generally, dicyandiamide is hard to dissolve in resin, so that when using it in a dispersed state, it is desirable that it is pulverized until the average grain size thereof is 0.5 to 20 $\mu$m. An average grain size of above 20 $\mu$m can result in uneven setting since the dicyandiamide will then settle, causing uneven dispersion. An average grain size of below 0.5 $\mu$m is not desirable either because the dicyandiamide will then be subject to secondary aggregation, which in turn leads to uneven setting and consequently variations in performance.

The amount of dicyandiamide to be added preferably ranges from 0.5 to 10 parts by weight (hereinafter abbreviated as parts) with respect to 100 parts of the epoxy resin. A more preferable range would be 1 to 5 parts. If the amount added is less than 0.5 parts, the setting time will be longer and the adhesive force lowered. An amount over 10 parts will result in an excessive number of ammonium ions being extracted by hydrothermal extraction in a pressure cooker test. In other words, the reliability of the semiconductors obtained will deteriorate.

The setting accelerator used in this invention is an imidazole type 2-phenyl-4-methyl-5-hydroxymethyl imidazole (hereinafter referred to as 2P4MHZ) and/or 2-phenyl-4,5-dihydroxymethyl imidazole (hereinafter referred to as 2 PHZ). They are both solid and have latency. They are components that serve to enable the paste to set rapidly. Further, these components contain hydroxyl groups in their molecules, so they also serve to improve the adhesive properties of the resin. Accordingly, they are very desirable setting accelerators for a die bonding resin paste.

The amount of these setting accelerators to be added preferably ranges from 0.1 to 8 parts with respect to 100 parts of the epoxy resin. A range from 1 to 5 parts is more preferable. An addition amount of below 0.1 parts will result in an inadequate setting accelerating effect. If, on the other hand, an amount of over 8 parts is added, setting will not be accelerated as much as might be expected. Instead, the life of the paste may be shortened.

It is desirable for the thermally conductive filler used in this invention to be one with a thermal conductivity of $2 \times 10^{-3}$ cal/cm.sec.deg or more, more preferably, $1 \times 10^{-2}$ cal/cm.sec.deg or more. It may consist of, for example, oxides of magnesium, aluminum, silicon, titanium, etc., or pulverized ceramics such as boron nitride, boron carbide, silicon carbide, aluminum carbide, etc. It is desirable that this thermally conductive filler be as cheap as possible. Oxides of aluminum and silicon are desirable since they are stable both thermally and chemically. The thermally conductive filler may be an electrically conductive filler such as pulverized carbon black or pulverized nickel, aluminum or tin as long as it has a satisfactory thermal conductivity. Such a filler may be used as the die bonding material to the extent that it does not deteriorate the requisite insulating properties.

Ion impurities contained in said thermally conductive filler such as alkali metals and halogens are preferably in an amount of 10 ppm or less each. Accordingly, the filler may be previously washed with water, solvent, etc., or its surface may be appropriately treated with a suitable surface treatment agent. The average grain size of said thermally conductive filler is preferably 20 $\mu$m or less, more preferably, 0.1 to 10 $\mu$m, so that the filler may be prevented from settling and a most appropriate adhesion thickness attained. A filler with a relatively large grain size may be appropriately mixed with one with a relatively small grain size.

The amount to be added of said thermally conductive filler ranges from 50 to 200 parts, more preferably 80 to 150 parts, with respect to 100 parts of the epoxy resin. When the amount is less than 50 parts, a sufficient thermal conductivity cannot be obtained. When, on the other hand, it is more than 200 parts, the adhesive force will deteriorate.

In order to improve the adhesive force and flexibility of the resin paste in accordance with this invention, a phenoxy resin having an average molecular weight of 15,000 to 60,000 may be added thereto in an appropriate amount. The amount to be added of this phenoxy resin preferably ranges from 1 to 15 parts with respect to 100 parts of the epoxy resin. An amount of less than 1 part will result in an insufficient improvement in adhesive force. An amount of more than 15 parts will lead to lowered operational efficiency since the viscosity of the paste will then become too high.

Further, a defoaming agent may be added in an appropriate amount to the thermosetting insulating resin paste in accordance with this invention as needed.

When manufacturing the resin paste of this invention, the above-mentioned epoxy resin, setting agent, setting accelerator, filler and other components used as needed, are kneaded in a grinder or a similar device of the sort at ordinary temperature, in such a manner that an even mixture is obtained. It is to be noted that the phenoxy resin used should be previously dissolved in an epoxy resin. The paste in accordance with this invention thus obtained can be preserved at ordinary temperatures for long periods of time (4 weeks or more), so that the operational efficiency thereof during use is quite satisfactory.

The resin paste in accordance with this invention can be applied, for example, to the adhesion sections of a semiconductor chip and a lead frame by means of an appropriate method such as by dispenser, screen printing, and stamping.

After being applied, the paste can be set at a low temperature in a short time, for example, by heating it at a temperature of 150° to 180 degrees C. within two minutes.

The set material obtained is free from voids and discharges very little impurities such as chlorine ions. Further, it excels in heat resisting properties.

The present invention will now be described in more detail with reference to the following working and comparative examples.

The materials shown in the table consist of the following:

$A_1$: Bisphenol A-type epoxy resin (epoxy equivalent: 190, viscosity: 200 poise (25 degrees C.), hydrolytic chlorine atom content: 400 ppm)

$A_2$: Bisphenol A-type epoxy resin (epoxy equivalent: 190, viscosity: 150 poise (25 degrees C.), hydrolitic chlorine atom content: 800 ppm)

B: Bisphenol F-type epoxy resin (epoxy equivalent: 195, viscosity: 40 poise (25 degrees C.), hydrolitic chlorine atom content: 400 ppm)

C: 3,4-epoxycyclohexylmethyl-3,4-epoxycyclohexanecarboxylic acid ester (Celoxyde 2021 manufactured by Daicel, Ltd., epoxy equivalent: 135, viscosity: 3 poise (25 degrees C.), hydrolitic chlorine atom content: 0 ppm)

Dicyandiamide: average grain size 10 m
Silica: average grain size $\mu$m ($Na^+$ content: 2 ppm)
Alumina: average grain size 0.5 $\mu$m ($Na^+$ content: 10 ppm)
Phenoxy resin: average molecular weight 30,000

EXAMPLE 1

The resin paste was prepared, as shown in the table, by kneading $A_1$ as the diglycidyl type liquid epoxy resin, dicyandiamide as the setting agent, 2P4MHZ as the setting accelerator, and silica, in a grinder in such a manner that an even mixture is obtained.

The viscosity (at 25 degrees C.), the specific weight and the pot life (when the viscosity at 25 degrees C. is 120% of that initially) of the resin paste thus obtained were measured. The result is shown in the table.

After being vacuum defoamed, the resin paste thus obtained is applied to a lead frame (Ag-metallized (die pad section)) by dispensing or stamping in a predetermined amount and a chip of 2 by 2 mm square was adhered thereto. After that, it was heated on a hot plate at 180 degrees C. for one minute. No void generation was observed during setting.

With the specimen obtained, Dishare adhesive force was measured at room temperature (ca. 25 degrees C.) and at 350 degrees C. using a push-pull gauge.

Further, a pressure cooker test was conducted in the following manner in order to measure the amount of impurities such as chlorine ions extracted by hydrothermal extraction.

The resin paste was placed in an oven at 150 degrees C. for 15 minutes to set, then the set substance was pulverized. Of the powder specimen obtained, 5 g of 100 mesh-pass powder was put in a Teflon vessel and 50 ml of pure water was added thereto. The mixture was put in a pressure vessel and was treated at 121 degrees C. for 20 hours in a completely sealed state. After being filtered, the extracted liquid thus obtained was examined. The concentrations of sodium ions ($Na^+$), ammonium ions ($NH_4^+$) and chlorine ions ($Cl^-$) were measured by means of ion exchange chromatography.

Further, a thermal analysis of the set substance of this resin paste was performed in nitrogen. It was found through the analysis that the substance begins to lose its weight at 370 degrees C. (by application of a tangential method to thermal weight loss curve) and that it presents a high thermal resistance. The thermal conductivity thereof was found to be $1 \times 10^{-3}$ (cal/cm.sec.degrees C.).

EXAMPLES 2-5

From the materials shown in the table, a resin paste was obtained in the same manner as in Example 1.

The properties of the resin paste obtained as will as those of the set substance thereof were examined in accordance with the same method as in Example 1. The result is shown in the table.

EXAMPLES 6 and 7

From the materials shown in the table, a resin paste was obtained in the same manner as in Example 1. The phenoxy resin had previously been dissolved in the epoxy resin.

The properties of the resin paste obtained as well as those of the set substance thereof were examined in accordance with the same method as in Example 1. The result is shown in the table. An improvement in adhesive force was observed in Examples 4 and 5 to which the phenoxy resin was added.

COMPARATIVE EXAMPLE 1

A resin paste was obtained from the materials shown in the table, in the same manner as in Example 1.

The properties of the resin paste thus obtained and those of the set substance thereof were examined in the same way as in Example 1. The result is shown in the table.

In this case, the amount of the alicyclic epoxy resin was rather too much so that a multitude of voids were generated during the setting at the adhesive force being of an extremely low level at room temperature and 350 degrees C. The set substance began to lose weight at 366 degrees C., but weight loss due to the alicyclic epoxy resins which had not reacted started at about 200 degrees C. This is undesirable because the chips could be contaminated during wire bonding.

COMPARATIVE EXAMPLE 2

From the materials shown in the table, a resin paste was obtained in the same manner as in Example 1.

The properties of the resin paste thus obtained as well as those of the set substance thereof were examined in accordance with the same method as in Example 1. The result is shown in the table.

In this case, the adhesive force at room temperature was 2000 g/mm$^2$ or more, however, it was only 200 g/mm$^2$ at 350 degrees C. With such an inadequate adhesive force, the bonded objects could come off during wire bonding. Further, the pot life of the resin paste was as short as 15 days.

Thus, the resin pastes according to Comparative Examples 1 and 2 only showed inferior properties to those of the resin pastes according to the Examples of the present invention.

| Examples | | | 1 | 2 | 3 | 4 | 5 | 6 | 7 | Comp. Example 1 | Comp. Example 2 |
|---|---|---|---|---|---|---|---|---|---|---|---|
| Mixing amount (part) | Epoxy resin* | $A_1$ | 100 | — | — | 100 | 100 | — | — | — | 100 |
| | | $A_2$ | — | 80 | — | — | — | — | — | 50 | — |
| | | B | — | — | 80 | — | — | 100 | 80 | — | — |
| | | C | — | 20 | 20 | — | — | — | 20 | 50 | — |
| | Dicyandiamide | | 4.0 | 4.0 | 4.0 | 2.0 | 4.0 | 4.0 | 4.0 | 4.0 | — |
| | 2P4MHZ | | 1.0 | 1.5 | 1.5 | 3.0 | — | 1.0 | 1.5 | 1.5 | — |
| | 2PHZ | | — | — | — | — | 1.5 | — | — | — | 10 |
| | Filler | Silica | 120 | 60 | 140 | 30 | 60 | 120 | 60 | 60 | 120 |
| | | Alumina | — | 40 | — | 60 | 40 | — | 40 | 40 | — |
| | Phenoxy resin | | — | — | — | — | — | 5 | 10 | — | — |
| Paste properties | Viscosity (poise 25° C.) | | 1020 | 650 | 400 | 980 | 1050 | 480 | 510 | 450 | 1000 |
| | Specific weight | | 1.7 | 1.7 | 1.8 | 1.6 | 1.7 | 1.7 | 1.7 | 1.7 | 1.7 |
| | Pot life · 25° C. | | 4 weeks < | 4 weeks < | 4 weeks < | 4 weeks < | 4 weeks < | 4 weeks < | 4 weeks < | 4 weeks < | 15 days |
| Setting conditions (Hot plate setting) | | | 180° C. × 1 min. | 180° C. × 1 min. | 180° C. × 1 min. | 180° C. × 1 min. | 180° C. × 1 min. | 180° C. × 1 min. | 180° C. × 1 min. | 180° C. × 1 min. | 180° C. × 1 min. |
| Void generation during setting | | | None | None | None | None | None | None | None | Many | Few |
| Set substance properties | Hydrothermal extraction | $Na^+$(ppm) | 0.2 | 0.3 | 0.2 | 0.2 | 0.2 | 0.2 | 0.3 | 0.2 | 0.3 |
| | | $NH_4^+$(ppm) | 15 | 18 | 17 | 10 | 15 | 15 | 16 | 17 | 7 |
| | | $Cl^-$(ppm) | 18 | 25 | 15 | 16 | 19 | 19 | 15 | 18 | 17 |
| | Adhesive force | Ordinary temperature (g/mm²) | 2000< | 2000< | 2000< | 2000< | 2000< | 2000< | 2000< | 2000< | 2000< |
| | | 350° C.(g/mm²) | 670 | 720 | 710 | 600 | 650 | 770 | 850 | 150 | 200 |
| | Thermal conductivity (cal/cm · sec · °C.) | | $1.5 \times 10^{-3}$ | $1.5 \times 10^{-3}$ | $2.0 \times 10^{-3}$ | $1.0 \times 10^{-3}$ | $1.5 \times 10^{-3}$ | $1.5 \times 10^{-3}$ | $1.5 \times 10^{-3}$ | $8.0 \times 10^{-4}$ | $1.5 \times 10^{-3}$ |
| | Weight loss start temp. (°C.) | | 370 | 376 | 365 | 372 | 368 | 360 | 364 | 366 | 357 |

(Note)*: $A_1$, $A_2$ and B represent diglycidyl type liquid epoxy resins, and C represents an alicyclic epoxy resin.

What is claimed is:

1. A thermosetting insulting resin paste comprising: 100 parts by weight of an epoxy resin containing a diglycidyl liquid epoxy resin as a main component; and based on the parts by weight of said epoxy resin; 0.5 to 10 parts by weight of dicyandiamide as a setting agent; 1 to 15 parts by weight of a phenoxy resin; 0.1 to 8 parts by weight of at least one of 2-phenyl-4-methyl-5-dihydroxymethylimidazole and 2-phenyl-4,5-dihydroxymethylimidazole as a setting accelerator; and 50 to 200 parts by weight of a thermally conductive filler.

2. A resin paste as claimed in claim 1 wherein the content of said diglycidyl liquid epoxy resin is 70 wt. % or more of the epoxy resin.

3. A resin paste as claimed in claim 1 wherein the content of said diglycidyl liquid epoxy resin is 80 wt. % or more of the epoxy resin.

4. A resin paste as claimed in claim 1 wherein said diglycidyl type liquid epoxy resin comprises at least one member selected from the group consisting of diglycidyl bisphenol A, diglycidyl bisphenol F, diglycidyl bisphenol S, 1,2-cyclohexane dicarboxylic acid diglycidyl ester, and polyglycol diglycidyl ether.

5. A resin paste as claimed in claim 1 wherein said epoxy resin contains no more than 20 wt. % of an alicyclic epoxy resin.

6. A resin paste as claimed in claim 1 wherein the mixed amount of said dicyandiamide which serves as the setting agent is 1 to 5 parts by weight.

7. A resin paste as claimed in claim 1 wherein the average particle diameter of the dicyandiamide which serves as the setting agent is 0.5 to 20 μm.

8. A resin paste as claimed in claim 1 wherein the mixed amount of said setting accelerator is 1 to 5 parts by weight.

9. A resin paste as claimed in claim 1 wherein the mixed amount of said thermally conductive filler is 80 to 150 parts by weight.

10. A resin paste as claimed in claim 1 wherein the average particle diameter of said thermally conductive filler is 20 μm or less.

11. A resin paste as claimed in claim 1 wherein the average particle diameter of said thermally conductive filler is 0.1 to 10 μm.

12. A resin paste as claimed in claim 1 wherein said thermally conductive filler consists of pulverized ceramics comprising oxides of magnesium, aluminum, silicon or titanium or boron nitride, boron carbide, silicon carbide, aluminum nitride.

13. A resin paste as claimed in claim 1 wherein said thermally conductive filler consists of pulverized carbon black.

14. A resin paste as claimed in claim 1 wherein said thermally conductive filler consists of pulverized metal comprising nickel, aluminum or tin.

15. A resin paste as claimed in claim 1 wherein the average molecular weight of said phenoxy resin ranges from 15,000 to 60,000.

16. A resin paste as claimed in claim 1 wherein said diglycidyl liquid epoxy resin has a hydrolytic halogen atom content of no more than 600 ppm.

17. A resin paste as claimed in claim 5 wherein said alicyclic epoxy resin includes diesters of aliphatic dibasic acids, epoxy cyclohexylmethylepoxycyclohexane carboxylic acid ester or vinyl cyclohexene dioxide.

18. A resin paste as claimed in claim 17 wherein said diesters of aliphatic dibasic acids include bis(epoxy cyclohexylmethyl) esters of adipic or succinic acid.

19. A resin paste as claimed in claim 1 wherein said thermally conductive filler comprises a material having a thermal conductivity of at least $2 \times 10^{-3}$ cal/cm.sec.-deg.

20. A resin paste as claimed in claim 1 wherein said resin paste sets at a temperature of 150° C. to 180° C. within two minutes.

* * * * *